United States Patent
Boeck

(10) Patent No.: US 10,837,319 B2
(45) Date of Patent: Nov. 17, 2020

(54) TURBINE CENTER FRAME HAVING A CENTERING ELEMENT

(71) Applicant: MTU Aero Engines AG, Munich (DE)

(72) Inventor: Alexander Boeck, Kottgeisering (DE)

(73) Assignee: MTU Aero Engines AG, Munich (DE)

(*) Notice: Subject to any disclaimer, the term of this patent is extended or adjusted under 35 U.S.C. 154(b) by 475 days.

(21) Appl. No.: 15/992,653

(22) Filed: May 30, 2018

(65) Prior Publication Data

US 2018/0347404 A1    Dec. 6, 2018

(30) Foreign Application Priority Data

Jun. 1, 2017  (EP) .................................... 17173969

(51) Int. Cl.
  *F01D 25/28* (2006.01)
  *F01D 25/00* (2006.01)
  *F01D 25/24* (2006.01)

(52) U.S. Cl.
  CPC ........... *F01D 25/28* (2013.01); *F01D 25/005* (2013.01); *F01D 25/24* (2013.01);
  (Continued)

(58) Field of Classification Search
  CPC ........ F01D 25/005; F01D 25/24; F01D 25/28; F01D 25/246; F05D 2260/30; F05D 2220/332; F05D 2300/6033
  See application file for complete search history.

(56) References Cited

U.S. PATENT DOCUMENTS 8,152,451 B2   4/2012  Manteiga et al.
8,371,812 B2   2/2013  Manteiga et al.
(Continued)

FOREIGN PATENT DOCUMENTS

EP   0513956   11/1992
EP   0924387   6/1999
WO   WO2015/038341   3/2015

*Primary Examiner* — Kenneth Bomberg
*Assistant Examiner* — Jesse M Prager
(74) *Attorney, Agent, or Firm* — Davidson, Davidson & Kappel, LLC

(57) ABSTRACT

A turbine center frame for a gas turbine having a plurality of first components and a plurality of second components alternately mutually adjacently disposed in circumferential direction and bounding a hot gas-conducting flow channel in radial direction, the first components each having two first overlapping portions, and the second components each having two second overlapping portions. In a transition from a first component to a second component, one of the first overlapping portions and one of the second overlapping portions overlap. A centering element, against which, the first components and the second components are braced along the circumferential direction and in the radial direction, centers the first components and the second components relative to a central axis of the turbine center frame. The first components and the second components are manufactured of a ceramic matrix composite, and each first component and each second component are provided with a first supporting portion and a second supporting portion mutually spaced apart at a distance in the circumferential direction, the first supporting portion and the second supporting portion being configured to act from different sides upon the centering element in the radial direction.

22 Claims, 2 Drawing Sheets

(52) U.S. Cl.
CPC .... *F05D 2220/323* (2013.01); *F05D 2260/30* (2013.01); *F05D 2300/6033* (2013.01)

(56) References Cited

U.S. PATENT DOCUMENTS

| | | | |
|---|---|---|---|
| 8,591,182 B2* | 11/2013 | Morgenstern | F01D 9/042 |
| | | | 415/138 |
| 2013/0094951 A1* | 4/2013 | McCaffrey | F01D 25/162 |
| | | | 415/200 |
| 2016/0246102 A1 | 8/2016 | Freeman et al. | |
| 2017/0016340 A1* | 1/2017 | Sakamoto | F01D 11/005 |
| 2017/0276000 A1* | 9/2017 | Snider | F01D 9/02 |
| 2018/0106160 A1* | 4/2018 | Thomas | F01D 25/246 |

\* cited by examiner

TURBINE CENTER FRAME HAVING A CENTERING ELEMENT

This claims the benefit of European Patent Application EP 17173769.1, filed Jun. 1, 2017, which is hereby incorporated by reference herein.

The present invention relates to a turbine center frame for a gas turbine, especially an aircraft gas turbine, having a plurality of first components and a plurality of second components that are circumferentially disposed, alternately mutually adjacently, and radially bound a hot gas-conducting flow channel, each of the first components having two first overlapping portions, and each of the second components having two second overlapping portions in such a way that, in a respective region of transition from a first component to a second component or vice versa, one of the first overlapping portions and one of the second overlapping portions are configured to be overlapping, and having at least one centering element against which, the first components and the second components are braced along the circumferential direction and in the radial direction in a way that substantially centers the first components and the second components relative to a central axis of turbine center frame.

Directional indications, such as "axial," "axially," "radial," "radially," and "circumferential" are basically to be understood relative to the machine axis of the gas turbine, unless explicitly or implicitly indicated otherwise from the context. The machine axis of the gas turbine can also be referred to as the central axis of the turbine center frame.

BACKGROUND

In turbine center frames, the components of the hot gas-conducting flow channel are generally joined by what are commonly known as ground overlaps. It is, therefore, necessary to circumferentially join these components via what are commonly known as centering strips, which are typically ring segments, at an axially leading region of the turbine center frame that can also be referred to as inlet. Centering strips of this kind prevent radial swinging out and vibration in the area of the ground overlap. In this context, the centering strips are inserted axially into slots formed in the components. In addition, the centering strips are secured by a retaining ring.

SUMMARY OF THE INVENTION

To save weight and to enhance efficiency over conventional metal components, it is being increasingly investigated to use alternative materials, such as ceramic fiber composite materials (ceramic matrix composites, CMC) in the gas turbine sector, especially in the turbine center frame sector for gas turbines. Alternative materials are difficult to be used for the above described conventional configurations for centering the components. It is especially difficult to provide (radially) narrow slots in components made of alternative materials, specifically of ceramic matrix composites, without having to make allowances for strength disadvantages.

It is an object of the present invention to provide a turbine center frame that can overcome the above disadvantages that are associated with alternative materials.

The present invention provides that the first components and the second components be manufactured of a ceramic matrix composite, and that each first component and each second component be provided with at least a first supporting portion and at least a second supporting portion that are circumferentially mutually spaced apart at a distance, the first supporting portion and the second supporting portion being configured to act radially from different sides upon the centering element.

A secure centering of the first and second components over the entire circumference is made possible by the first and second supporting portions being mutually spaced apart at a distance and acting or engaging on different sides of the centering element. In the process, the known, radially narrow slots already described above are, as it were, broken or split open. A first supporting portion and a second supporting portion, that act upon the centering element from different sides at different circumferential positions, form, so to speak, the radial boundaries of a slot that is not configured to be circumferentially traversing. Therefore, there is no need for a radially narrow slot that is especially difficult to fabricate using ceramic matrix composites. Specifically, the first supporting portion and the second supporting portion may abut exclusively against one side, especially exclusively against one of two opposite sides of the centering element and, at the same time, thereby against different, in fact, opposite sides of the centering element.

The first supporting portion and the second supporting portion may be manufactured from the ceramic matrix composite. The first supporting portion may thereby be configured as a radial projection, especially as a radial thickening of a respective first component or of a respective second component. Accordingly, such a radial projection or radial thickening may be laminated when manufactured from a ceramic matrix composite.

Moreover, all radial projections may act radially upon the centering element from a same first side. The first side may thereby be the radially outer side or the radially inner side of the centering element.

The second supporting portion may be hook-shaped, specifically configured as an L-shaped hook. Such a hook-shaped supporting portion may be selected to have dimensions that allow it to be manufactured from the ceramic matrix composite, specifically laminated. In particular, arcuate or curved regions of the hook may be thereby formed to have radii that prevent buckling or bending of the laminate layers in those regions. The L-shaped hook extends mainly radially and axially from the respective first component or second component. This means that the two sides of the L extend essentially radially and axially. The length of the two sides of the hook in the particular direction may be selected to make possible a manufacture from a ceramic matrix composite. Accordingly, the hook-shaped design of the second supporting portion makes possible a sufficient strength of the second supporting portion(s).

Moreover, all hook-shaped, second supporting portions may engage behind the centering element and act radially thereon from a same second side. The second side may thereby be the radially outer side or the radially inner side of the centering element. In any case, the first side and the second side, already mentioned above, are different (radial) sides of the centering element.

The centering element may have an axially and circumferentially extending centering portion against which the first supporting portions and the second supporting portions abut. The centering portion thereby essentially corresponds to a type of spring element that is accommodated between the first and second supporting portions, for example, analogously to a conventional tongue being received in a conventional groove. It is again noted here that there is no through-going slot provided in the first and second components in the case of the centering presented here.

Along the circumferential direction, the centering element may also feature a plurality of sealing portions that extend radially toward the first or second components. A recess may be formed on the centering element in the region of the transition from a first component to a second component or vice versa. It forms a gap between two adjacent sealing portions. The centering portion and the sealing portions may also be integrally joined. The sealing portions and the centering portion form a type of T shape, the centering portion forming the pillar of the T, and the sealing portions the crossbar of the T.

It is also provided that the turbine center frame include a retaining ring that is adapted for limiting an axial movement of the centering element.

The first components may each feature two first supporting portions and two second supporting portions, the two second supporting portions being disposed circumferentially between the two first supporting portions. A first component hereby abuts against the centering portion in at least four positions and is radially stabilized.

Moreover, the second components may each have a first supporting portion and two second supporting portions, the first supporting portion being circumferentially disposed between the two second supporting portions. A second component hereby abuts against the centering portion in at least three positions and is radially stabilized.

It is also provided that, relative to the axial direction or the main flow direction, the centering element, the first supporting portions and the second supporting portions are configured in the inlet region of the turbine center frame, the first supporting portions and the second supporting portions preferably being configured on the side of the first components and of the second components that face away from the hot gas-conducting flow channel.

Finally, the present invention also relates to a gas turbine, especially an aircraft gas turbine having an above described turbine center frame, the turbine center frame being disposed between a first turbine stage, especially a high-pressure turbine, and a subsequent turbine stage, especially a medium- or low-pressure turbine; relative to the main flow direction of the gas turbine, the centering element, the first supporting portions and the second supporting portions preferably adjoining the first turbine stage.

BRIEF DESCRIPTION OF THE DRAWINGS

The present invention will be explained exemplarily in the following with reference to the enclosed figures without being limited thereto.

In a schematic and simplified view in the axial direction, especially in an overview and in an enlarged detail view (boxed by a dash-dot line)

In subfigures A) through C)

DETAILED DESCRIPTION

Figure 1:
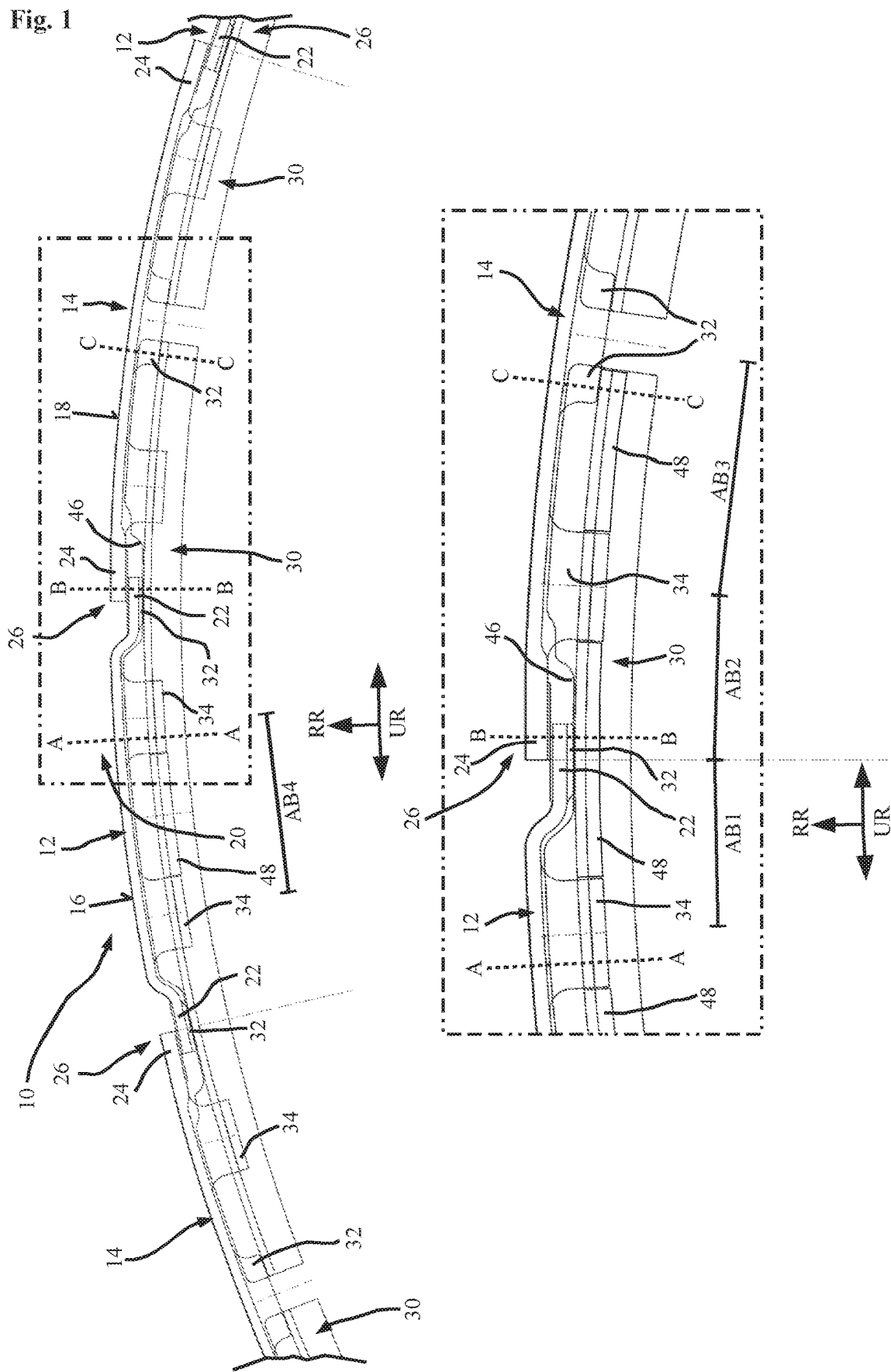
FIG. 1 shows first and second components of a flow channel of a turbine center frame including the overlapping region thereof and the centering element.

FIG. 1 shows a detail view of a turbine center frame 10 having a first component 12 and a second component 14. First component 12 and second component 14 are adjacently disposed in circumferential direction UR. As is readily apparent from the representation, an alternating sequence of first components 12 and second components 14 forms a ring that, in a sectional view, is essentially closed and, however, is only partially shown in FIG. 1.

First components 12 and second components 14 feature a respective side 16, 18, that faces a hot gas-conducting flow channel 20. In other words, first components 12 and second components 14 bound hot gas-conducting flow channel 20. First components 12 illustrated here and second components 14 form a radially inner boundary of hot gas-conducting flow channel 20. On the side facing away from hot gas-conducting flow channel 20, components 12, 14 are joined to structural components of turbine center frame 10 that are disposed about a shaft of the gas turbine. It should be appreciated that components 12, 14 may not only be used radially inwardly (relative to flow channel 20 having a convex curvature), but may also serve as a radially outer boundary of hot gas-conducting flow channel; in conformance therewith, it being the case that components 12, 14 would have a different concave curvature (relative to flow channel 20) than components 12, 14 shown in FIG. 1.

First components 12 have respective first overlapping portions 22. Second components 14 have respective second overlapping portions 24. At a transition 26 from a first component 12 to a second component 14, first overlapping portion 22 and second overlapping portion 24 are disposed one over the other in radial direction RR. First overlapping portion 22 and second overlapping portion 24 rest against each other, essentially sealing hot gas-conducting flow channel 20. The overlapping at transitions 26 is selected to be retained even in the case of thermally induced expansion or contraction of first components 12 or of second components 14. In other words, first components 12 and second components 14 are movable relative to each other at least in circumferential direction UR.

First components 12 and second components 14 are manufactured from a ceramic matrix composite which is described in the following as CMC. Since components made of CMC are generally produced by laminating various layers, it being essential to consider the flow of the fibers in accordance with the form design of the finished component, it is necessary to configure first and second components 12, 14 in a way that both makes possible the manufacture thereof from CMC and ensures the centering thereof relative to the machine axis.

To center first and second components 12, 14, turbine center frame 10 includes at least a centering element 30, preferably a plurality of centering elements 30, against which first and second components 12, 14 may be braced. Centering element 30 and the configuration of first and second components 12, 14 at centering element 30 are also explained in the following with reference to the sectional views of FIG. 2A through 2C.

A plurality of centering elements 30 may also be used as shown in FIG. 1. Centering elements 30 may, in particular, also be in the form of centering strips and/or ring segments.

Both first component 12, as well as second component 14 have respective first supporting portions 32 and respective second supporting portions 34. In this context, first supporting portions 32 engage from the one side on respective centering element 30, in the exemplary embodiment, from radially outwardly. Second supporting portions 34 engage from the other side on respective centering element 30, in the exemplary embodiment, from radially outwardly.

Once again with reference to FIG. 1, it is apparent that first supporting portions 32 and second supporting portions 34 are generally spaced apart from each other at a distance AB in circumferential direction UR. Based on the enlarged detail of FIG. 1, second supporting portion 34 (to the left in the representation) and first supporting portion 32 of first component 12 are mutually spaced apart by a distance AB1. A distance AB2 is provided between first supporting portion 32 of first component 12 and second supporting portion 34 of second component 14. Moreover, a distance AB3 is provided between second supporting portion 34 of second component 14 and first supporting portion 32 of second component 14. As is readily apparent from FIG. 1, first supporting portions 32 and second supporting portions 34 are not necessarily alternately disposed. Rather, it is also possible for two same supporting portions to be successively disposed in circumferential direction UR. An example of this in the present specific embodiment is two supporting portions 34 at first component 12. Distances AB1, AB2, AB3 may be essentially the same or differ from one another. In the present specific embodiment, distances AB1 and AB2 are selected to be essentially the same. Distance AB3 is selected to be somewhat larger than distances AB1 and AB2. A further distance AB4 between the two supporting portions of first component 12 is selected to be even somewhat larger than distance AB3. A distance AB may thereby be a straight connecting line that connects two points at the same radial distance from the machine axis; relative to a circumferential extent of the respective supporting portion, the two points being approximately centrally disposed, for example. Thus, first supporting portions 32 and second supporting portions 34 act alternately and sectionally upon respective centering element 30.

In the specific embodiment presented here, the first component has two supporting portions 34 that are disposed between two supporting portions 32, viewed in circumferential direction UR. The second component has a first supporting portion 32 that is configured between two second supporting portions 34. It should be appreciated that the number of first and second supporting portions 32, 34 per component 12, 14 is variable or selectable. For example, if first and second components 12, 14 are envisaged to be the radially outer boundary of the hot gas-conducting flow channel (not shown here), then, because of the larger circumference, either more supporting portions 32, 34 are to be provided per component 12, 14, or/and the distances between the supporting portions 32, 34 are to be enlarged or changed.

Centering element 30 has an essentially T-shaped cross section having a sealing portion 36 and a centering portion 38. Sealing portion 36 essentially extends in radial direction RR and circumferential direction UR. Centering portion 38 essentially extends in axial direction AR and circumferential direction UR. Centering portion 38 and sealing portion 36 are disposed essentially mutually orthogonally. The purpose of sealing portion 36, in particular, is to restrict fluid flows outside of the hot gas-conducting flow channel. First and second supporting portions 32, 34 of respective first or second components 12, 14 are braced against centering portion 38.

Figure 2A:
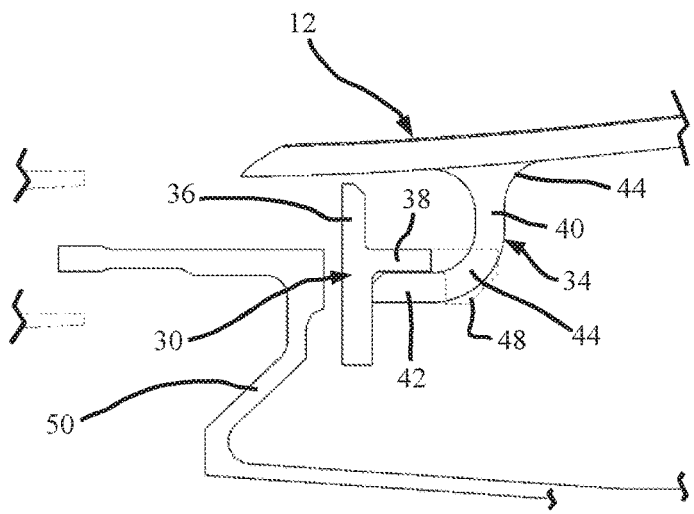
FIG. 2 shows three enlarged sectional views that correspond more or less to lines of intersection A-A, B-B and C-C of FIG. 1.

In the area of section A-A (FIG. 1), which is shown in FIG. 2A, second supporting portion 34 engages behind bearing portion 38 of centering element 30. Second supporting portion 34 has a hook-shaped form, specifically an L shape. Second supporting portion 34 has a base portion 40 that is joined to first component 12 and an engagement portion 42 that is connected to centering portion 38. The transitions or curvatures 44 between first component 12 and base portion 40, respectively between base portion 40 and engagement portion 42 are selected to provide arcuate, but not buckled or bent fibers of the CMC material at these locations, so that second supporting portion 34 has a desired stability and strength. In the present example, the purpose of second supporting portion 34 is especially to prevent a radially outward movement of first component 12. It should be appreciated that, in the sectional view, a second supporting portion 34 provided at a second component 14 essentially has a same or analogous structure as second supporting portion 34 of first component 12 shown in FIG. 2A.

Figure 2B:
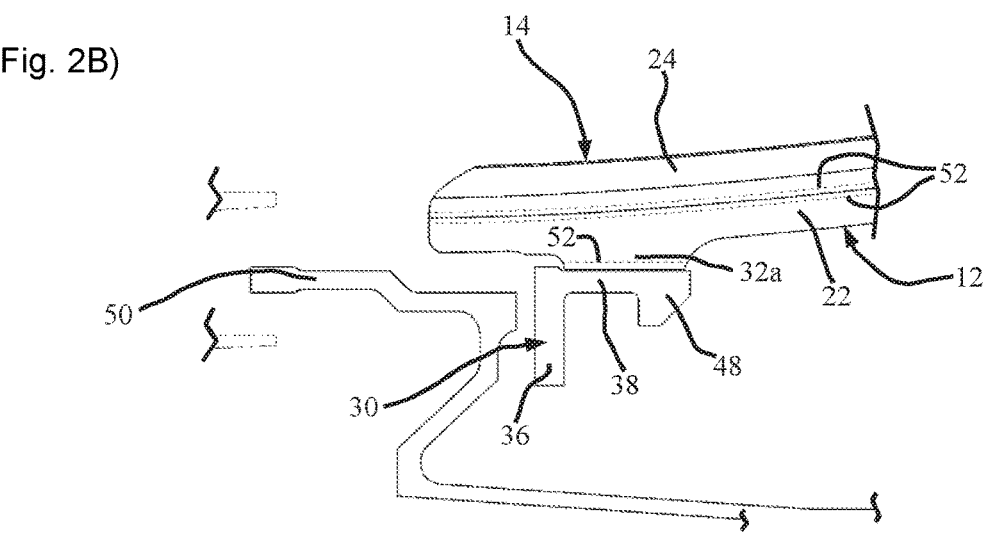

The sectional view of FIG. 2B shows the section along line of intersection B-B of FIG. 1 in transition region 26 between first component 12 and second component 14. It is readily apparent from the representation that the two overlapping portions 22, 24 are disposed one over the other in radial direction RR. Overlapping portions 22, 24 rest against each other in transition region 26. First component 12, which is disposed radially inwardly by overlapping portion 22 thereof, has a first supporting portion 32a which is configured as a type of thickening or projection in radial direction RR. First supporting portion 32a rests on centering portion 38 of centering element 30. In other words, first supporting portion 32a acts radially outwardly on centering element 30 or centering portion 38 thereof. The overlapping of the two components 12, 14 in transition region 26 provides sealing portion 36 in this region with a recess 46. Accordingly, centering element 30 in this region has a somewhat incomplete T-shape.

Figure 2C:
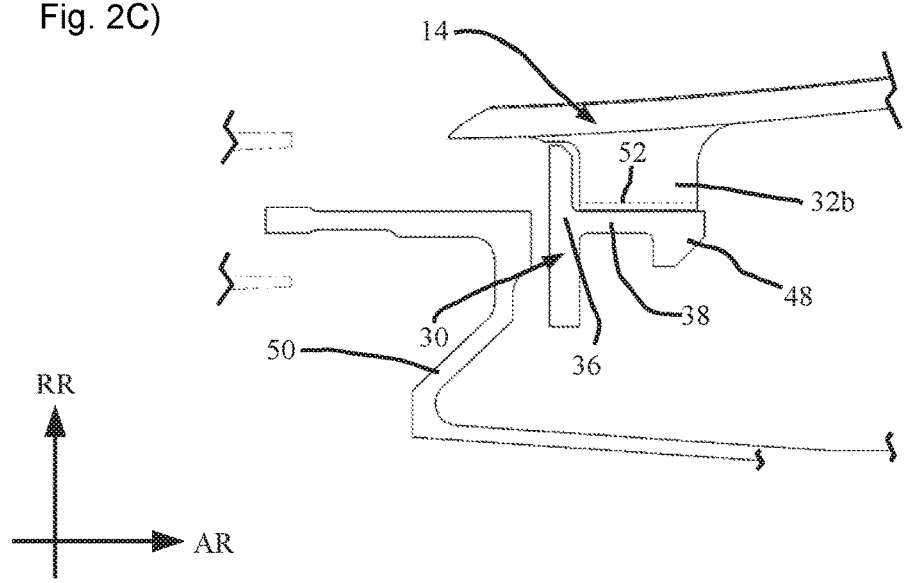

Finally, sectional view of FIG. 2C shows the section along line of intersection C-C of FIG. 1. A first supporting portion 32b of second component 14 abuts radially outwardly against centering portion 38. First supporting portion 32b is configured as a radial thickening or as a projection. The thickening is thereby selected to allow first supporting portion 32b to bridge the radial height of sealing portion 36. First supporting portion 32a of first component (FIG. 2B) and first supporting portion 32b of second component 14 (FIG. 2C) essentially differ only in the radial extent or thickness thereof. The function and type of configuration as a projection or thickening are essentially the same.

From the overall view of FIGS. 1 and 2 and the resultant sequence of first and second supporting portions 32, 34, it is readily apparent that first and second components 12, 14 at respective centering element 30, especially centering portion 38 thereof, are hereby braced to be essentially immovable in radial direction RR relative to centering element 30. Thus, the sequence of first supporting portions 32 and second supporting portions that act in each particular case upon centering portion 38 from different sides (from radially inwardly or radially outwardly) makes possible a desired centering of first and second components 12, 14 relative to a machine axis. Moreover, this radial fixing in position prevents components 12, 14 from swinging out, especially in (overlapping) transition region 26.

Also readily apparent from FIG. 2A through 2C is a securing portion 48 which is sectionally configured on centering portion 38 of centering element 30 along circumferential direction UR. In particular, securing portion 48 is used as a limit stop at second supporting portions 34 in circumferential direction UR. Accordingly, a movement is restricted in circumferential direction UR of centering elements 30 relative to components 12, 14.

For the sake of completeness, it should also be appreciated that what is generally referred to as a retaining ring 50 is illustrated in FIG. 2A through 2C. It axially restricts centering element 30 in the movement thereof or retains the same in the desired position thereof. Also shown in FIG. 2A through 2C are dashed lines 52, especially for overlapping regions 22, 24 and first supporting portions 32a, 32b. Purely schematically, these dashed lines 52 show a material thickening at the corresponding locations of components 12, 14; these material thickenings being removable as needed to compensate for tolerances during the final assembly of CMC components.

The centering of components 12, 14, as illustrated here, is provided forwardly relative to a main flow direction in turbine center frame 10, respectively at an inlet opening. In the flow direction, such an inlet opening generally follows a first turbine stage, especially a high-pressure turbine. First and second components 12, 14 illustrated here, together with the first or second supporting portions 32, 34 thereof are manufactured from a ceramic matrix composite (CMC), the form and configuration of supporting portions 32, 34 being selected to allow manufacturing from CMC and strength and stability requirements to be fulfilled for the function thereof.

REFERENCE NUMERAL LIST 10 turbine center frame
12 first component
14 second component
16 side facing the flow channel
18 side facing the flow channel
20 flow channel
22 first overlapping portion
24 second overlapping portion
26 transition region
30 centering element
32, 32a, 32b first supporting portion
34 second supporting portion
36 sealing portion
38 centering portion
40 base portion
42 engagement portion
44 curvature
46 recess
48 securing portion
50 retaining ring
52 material thickening (dashed line)

What is claimed is:

1. A turbine center frame for a gas turbine comprising:
a plurality of first components and a plurality of second components alternately mutually adjacently disposed in a circumferential direction and bounding a hot gas-conducting flow channel in a radial direction, the plurality of first components each having two first overlapping portions, and the plurality of second components each having two second overlapping portions in such a way that, in a respective region of transition from one of the first components to one of the second components or vice versa, one of the first overlapping portions and one of the second overlapping portions are configured to be overlapping, and
a centering element against which the plurality of first components and the plurality of second components are braced along the circumferential direction and in the radial direction in a way that centers the plurality of first components and the plurality of second components relative to a central axis of the turbine center frame;
wherein the plurality of first components and the plurality of second components are manufactured of a ceramic matrix composite, and each first component and each second component are provided with at least a first supporting portion and at least a second supporting portion mutually spaced apart at a distance in the circumferential direction, the at least a first supporting portion and the at least a second supporting portion being configured to act from different sides upon the centering element in the radial direction; and
wherein, along the circumferential direction, the centering element has a plurality of sealing portions extending in the radial direction toward the plurality of first components or the plurality of second components.

2. The turbine center frame as recited in claim 1 wherein the at least a first supporting portion and the at least a second supporting portion are manufactured from the ceramic matrix composite.

3. The turbine center frame as recited in claim 1 wherein the at least a first supporting portion is configured as a radial projection.

4. The turbine center frame as recited in claim 3 wherein the radial projection is a radial thickening of a respective first component or of a respective second component.

5. The turbine center frame as recited in claim 3 wherein all radial projections act upon the centering element in the radial direction from a same first side.

6. The turbine center frame as recited in claim 1 wherein the at least a second supporting portion is configured to be hook-shaped.

7. The turbine center frame as recited in claim 6 wherein the at least a second supporting portion is an L-shaped hook.

8. The turbine center frame as recited in claim 6 wherein all hook-shaped, second supporting portions engage behind the centering element and act radially thereon from a same second side.

9. The turbine center frame as recited in claim 1 wherein the centering element has a centering portion extending in the axial direction and the circumferential direction against which the at least a first supporting portion and the at least a second supporting portion abut.

10. The turbine center frame as recited in claim 1 wherein in the respective region of transition from one of the first components to one of the the second components or vice versa, a recess forms a gap between two adjacent sealing portions and is formed on the centering element.

11. The turbine center frame as recited in in claim 1 wherein the centering portion and the sealing portions are integrally joined together in one piece.

12. The turbine center frame as recited in claim 1 further comprising a retaining ring adapted for limiting a movement of the centering element in the axial direction.

13. The turbine center frame as recited in claim 1 wherein the first components each feature two first supporting portions and two second supporting portions, the two second supporting portions being disposed circumferentially between the two first supporting portions.

14. The turbine center frame as recited in claim 1 wherein the plurality of second components each have one first supporting portion and two second supporting portions, the one first supporting portion being circumferentially disposed between the two second supporting portions.

15. The turbine center frame as recited in claim 1 wherein, relative to the axial direction or a main flow direction, the centering element, the plurality of first supporting portions and the plurality of second supporting portions are configured in an inlet region of the turbine center frame.

16. The turbine center frame as recited in claim 15 wherein the at least a first supporting portion and the at least a second supporting portion of each of the plurality of first components and the plurality of second components are configured on a side of the respective first components and of the respective second components facing away from the hot gas-conducting flow channel.

17. A gas turbine comprising: the turbine center frame as recited in claim 1, the turbine center frame being disposed between a first turbine stage and a subsequent turbine stage relative to a main flow direction of the gas turbine.

18. The gas turbine as recited in claim 17 wherein the centering element, and the at least a first supporting portion and the at least a second supporting portion of each of the plurality of first components and the plurality of second components, adjoin the first turbine stage.

19. The gas turbine as recited in claim 17 wherein the first turbine stage is a high-pressure turbine and the subsequent turbine stage is a medium- or low-pressure turbine.

20. The gas turbine as recited in claim 17 wherein the gas turbine is an aircraft engine.

21. A turbine center frame for a gas turbine comprising:
a plurality of first components and a plurality of second components alternately mutually adjacently disposed in a circumferential direction and bounding a hot gas-conducting flow channel in a radial direction, the plurality of first components each having two first overlapping portions, and the plurality of second components each having two second overlapping portions in such a way that, in a respective region of transition from one of the first components to one of the second components or vice versa, one of the first overlapping portions and one of the second overlapping portions are configured to be overlapping, and a centering element against which the plurality of first components and the plurality of second components are braced along the circumferential direction and in the radial direction in a way that centers the plurality of first components and the plurality of second components relative to a central axis of the turbine center frame;

wherein the plurality of first components and the plurality of second components are manufactured of a ceramic matrix composite, and each first component and each second component are provided with at least a first supporting portion and at least a second supporting portion mutually spaced apart at a distance in the circumferential direction, the at least a first supporting portion and the at least a second supporting portion being configured to act from different sides upon the centering element in the radial direction; and wherein, relative to the axial direction or a main flow direction, the centering element, the plurality of first supporting portions and the plurality of second supporting portions are configured in an inlet region of the turbine center frame.

22. The turbine center frame as recited in claim 21 wherein the at least a first supporting portion and the at least a second supporting portion of each of the plurality of first components and the plurality of second components are configured on a side of the respective first components and of the respective second components facing away from the hot gas-conducting flow channel.

* * * * *